United States Patent
Sadofsky

(10) Patent No.: US 11,839,332 B2
(45) Date of Patent: Dec. 12, 2023

(54) GRINDING APPARATUS

(71) Applicant: Joseph Sadofsky, Rye, NY (US)

(72) Inventor: Joseph Sadofsky, Rye, NY (US)

(*) Notice: Subject to any disclaimer, the term of this patent is extended or adjusted under 35 U.S.C. 154(b) by 31 days.

(21) Appl. No.: 17/498,280

(22) Filed: Oct. 11, 2021

(65) Prior Publication Data
US 2023/0114122 A1  Apr. 13, 2023

(51) Int. Cl.
*A47J 42/04* (2006.01)
*A47J 42/10* (2006.01)
*A47J 42/40* (2006.01)

(52) U.S. Cl.
CPC .............. *A47J 42/04* (2013.01); *A47J 42/10* (2013.01); *A47J 42/40* (2013.01)

(58) Field of Classification Search
CPC .. A47J 42/22; A47J 42/24; A47J 42/28; A47J 42/32; A47J 42/34; A47J 42/38; A47J 42/40
See application file for complete search history.

(56) References Cited

U.S. PATENT DOCUMENTS

| | | | |
|---|---|---|---|
| 4,304,363 A | 12/1981 | Atkielski | |
| 2017/0297033 A1 | 10/2017 | Li | |
| 2018/0103805 A1 | 4/2018 | Huang | |
| 2018/0126386 A1* | 5/2018 | Witko | B02C 18/16 |
| 2018/0199759 A1 | 7/2018 | Qiu | |
| 2022/0071448 A1* | 3/2022 | Hansen | A47J 42/24 |
| 2022/0183342 A1* | 6/2022 | He | A24B 7/06 |

FOREIGN PATENT DOCUMENTS

DE  202019001056 U1 *  8/2019

OTHER PUBLICATIONS

English translate (DE202019001056U1), retrieved date Dec. 23, 2022.*

* cited by examiner

*Primary Examiner* — Matthew Katcoff
*Assistant Examiner* — Mohammed S. Alawadi
(74) *Attorney, Agent, or Firm* — Gearhart Law, LLC; David Postolski

(57) ABSTRACT

A grinding assembly for grinding a partially dried or a dried substance is described. The assembly include a first component, a second component, a chamber component, a disc component, a first magnetic component, and a second magnetic component. The first magnetic component maintains a magnetic connection with the second magnetic component to affix the first component to the chamber component. Upon user rotation of the first component, a first set of protrusions of the first component are moved such that the first set of protrusions engage a second set of protrusions of the chamber component to grind the substance. In response to such rotation, the substance is ground into a much thicker consistency that resembles a hand-broken consistency. The ground substance falls through a plurality of openings of the chamber component into the second component for storage.

14 Claims, 17 Drawing Sheets

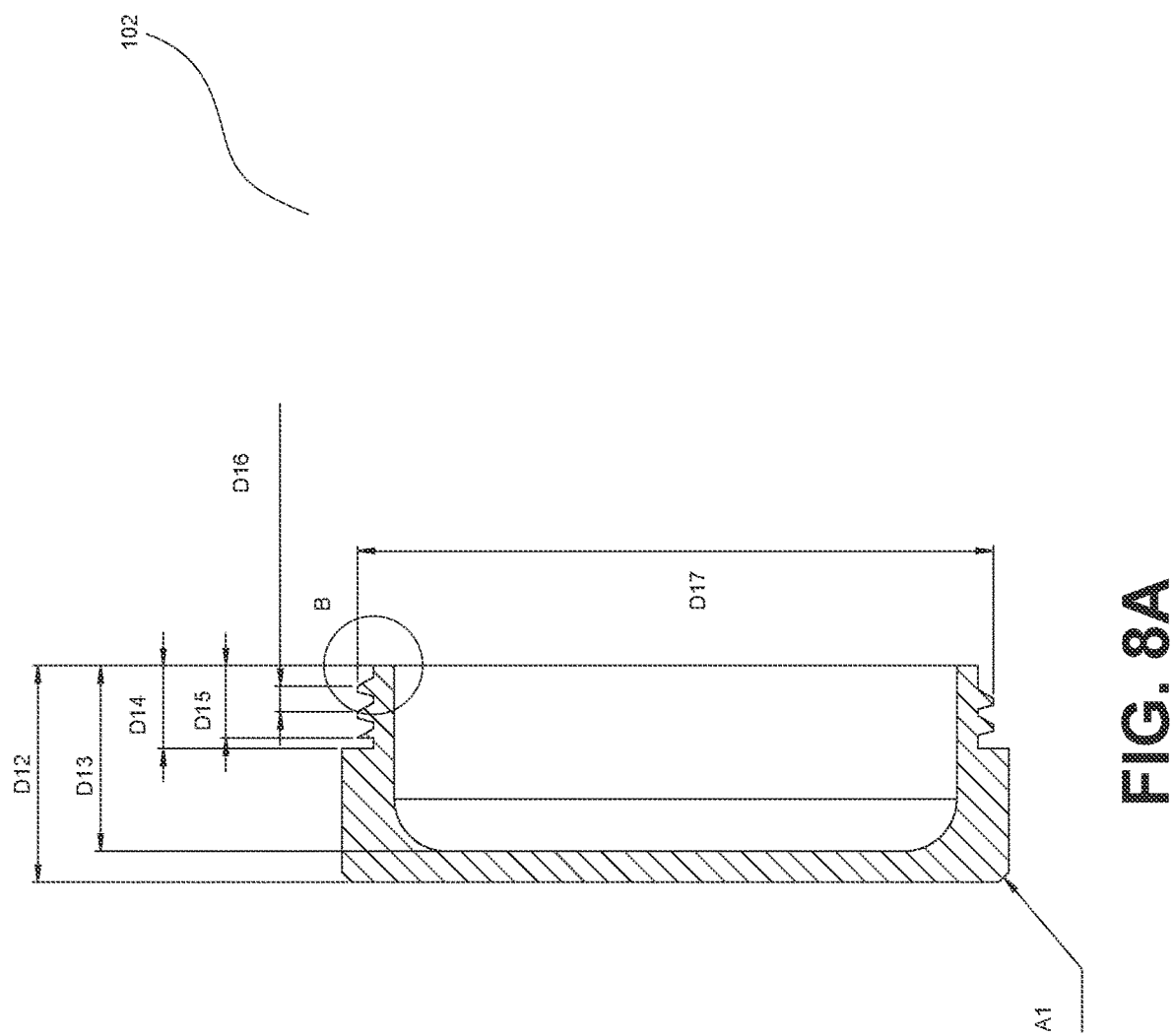

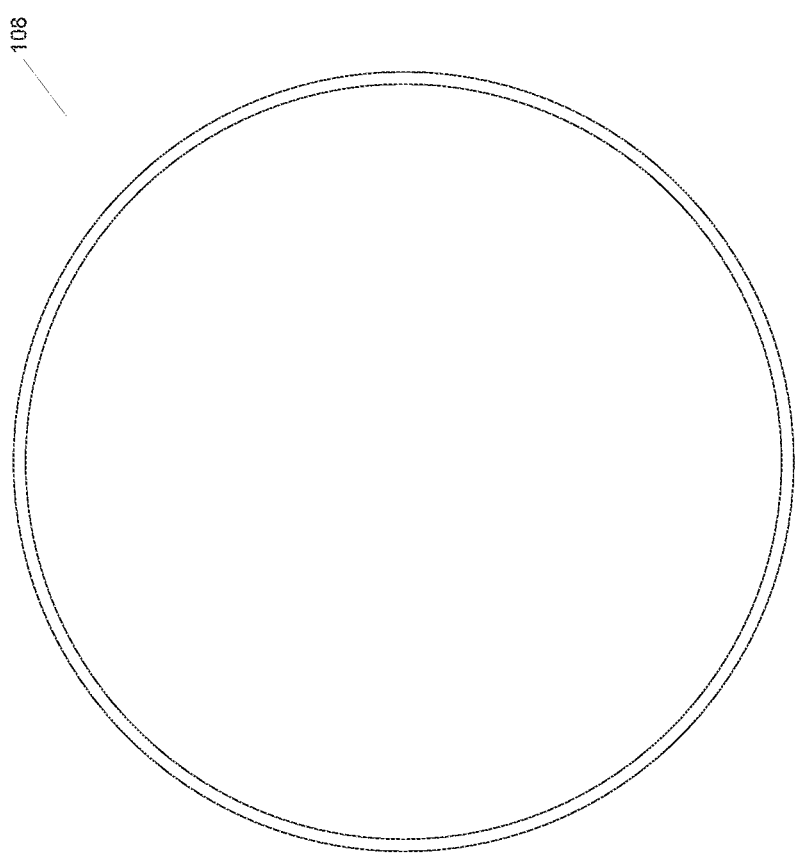

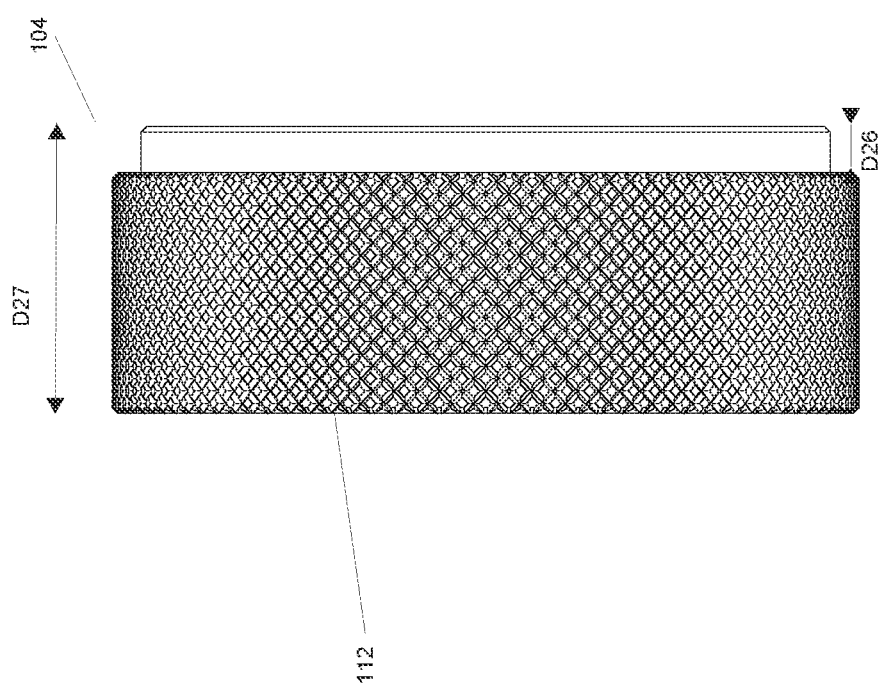

GRINDING APPARATUS

FIELD OF THE EMBODIMENTS

The field of the invention and its embodiments relate to a grinding apparatus or assembly. In particular, the field of the invention and its embodiments relate to a grinding apparatus or assembly for grinding a partially dried substance or a dried substance such that the ground substance may be handled and smoked in a pipe. In specific embodiments, the field of the invention and its embodiments relate to a herb grinding apparatus or assembly that grinds the herb into a much thicker consistency that resembles a hand-broken consistency.

BACKGROUND OF THE EMBODIMENTS

Though tobacco products have been produced and sold as pre-manufactured products (e.g., pre-made cigarettes) by commercial enterprises for years, there is still a demand for handmade tobacco products. Many consumers prefer hand-grinding their tobacco with an assembly, where such ground product may be smoked out of a pipe or may be used in a handmade cigarette. Grinder assemblies also typically provide a convenient compartment or location for the user to store their ground product prior to use. However, an improved grinder assembly is needed that allows for the grinding of a partially dried substance or a dried substance such that the ground substance may be handled and smoked in a pipe. Further, an improved herb grinder assembly is needed that grinds herbs into a much thicker consistency that resembles a hand-broken consistency.

Review of related technology:

US20180199759A1 describes a tobacco grinder allowing direct transfer of ground tobacco to a smoking implement to eliminate waste. The grinder includes an upper cover, a middle cover, and a material receiving base. The upper cover is rotatably positioned at one end of the middle cover the material receiving base is detachably connected to the end of the middle cover. A space between the upper cover and the middle cover defines a grinding cavity. A filter hole is defined on the middle cover, and a discharge hole is defined on the material receiving base, forming an escape path for tobacco which has been ground into particles. A sealing member is detachably coupled to the discharge hole, thus the discharge hole can be closed or opened. The ground tobacco can be directly transferred as required into the electronic cigarette.

US20180103805A1 describes a tobacco grinder comprising an upper cover, a rotary blade connected to the bottom of the upper cover, and a bottom cover. An upper ring and a lower ring are arranged between the upper cover and the bottom cover which are connected to the upper ring and the lower ring through threads correspondingly, and connected through threads. The upper ring is provided with a central through hole, and a multi-hole mesh is installed at the lower end opening of the upper ring. Three feeding holes are formed in the top of the upper ring. A filter screen is installed at the bottom of the lower ring together with a compression ring.

US20170297033A1 discloses an electric tobacco grinder. The grinder includes an electric controlling member and a grinding member, where the electric controlling member comprises a body case for electric controlling member, two batteries, a reducing motor, and a PCBA controlling board. The reducing motor is disposed within the inner center of the body case. The batteries are disposed in the corresponding battery container of the body case, where the two battery containers are located adjacent to both sides of the reducing motor. The PCBA controlling board is disposed within a flat port of the body case. Further, the grinding member comprises: a grinding upper case, a grinding lower case, a bottom cover, an upper reamer and a lower reamer. The grinding upper case is embedded to fix itself under the body case. The lower reamer is disposed within the grinding lower case that is screwed up beneath the grinding upper case.

U.S. Pat. No. 4,304,363A describes a compact grinder for material used for cigarettes.

The grinder comprises a housing having upper and lower halves which are arranged to rotate relative to each other, a sieve positioned horizontally in the end of a half of the housing, and grinding means positioned within the housing and arranged to grind tobacco therein upon the rotation of the halves of the housing relative to each other, whereby the ground foreign particle free material is passed out through the sieve and collected in a cap. The cap is adapted to collect a desired amount of material such that said material may be applied directly from the cap to a rolling paper used for cigarettes.

Various similar systems exist. However, their means of operation are substantially different from the present disclosure, as the other inventions fail to solve all the problems taught by the present disclosure. For example, these systems shred a partially dried substance or a dried substance, such as tobacco. The present invention and its embodiments provides an improved herb grinding apparatus or assembly that grinds the herb into a much thicker consistency that resembles a hand-broken consistency. The shredded substance formed from traditional systems known in the art field differs from the consistency of the ground substance formed by the present invention.

SUMMARY OF THE EMBODIMENTS

The present invention and its embodiments relate to a grinding apparatus or assembly. In particular, the present invention and its embodiments relate to a grinding apparatus or assembly for grinding a partially dried substance or a dried substance such that the ground substance may be handled and smoked in a pipe. Further, the present invention and its embodiments provides an improved herb grinding apparatus or assembly that grinds the herb into a much thicker consistency that resembles a hand-broken consistency, which differs from the consistency formed from traditional systems.

An embodiment of the present invention describes a grinding assembly for grinding a substance. The substance may be a partially dried substance or a dried substance. In examples, the ground substance is tobacco, an herb, or *cannabis*, among others. In preferred examples, the improved herb grinding assembly grinds the herb into a much thicker consistency that resembles a hand-broken consistency. However, it should be appreciated that the substance is not limited to these specific examples described herein. Moreover, the ground substance may be handled and smoked in a pipe or may be used in a handmade cigarette. In examples, the grinding assembly is cylindrical in shape.

The grinding assembly generally includes a first component, a second component, a chamber component, a disc component, a first magnetic component, and a second magnetic component. The first component comprises a first side disposed opposite a second side, a wall located around a periphery of and extending away from the second side, and a first set of protrusions extending away from the second side.

The second component includes a first side disposed opposite a second side, a wall located around a periphery of and extending away from the second side to create a first concave portion, and a first threaded portion disposed on a periphery of the wall.

The chamber component includes a body portion comprising a first side disposed opposite a second side, where the second side includes a second threaded portion configured to interact with the first threaded portion of the second component to affix the second component to the chamber component. The chamber component also includes a wall located around a periphery and extending away from the first side to create a second concave portion.

The wall of the chamber component comprises a first circumference and second component comprises a second circumference. The first circumference is less than the second circumference such that a lip portion is created between an exterior of the wall and an exterior of the chamber component. Moreover, the chamber component also includes a second set of protrusions located on the first side of the second concave portion and extending away from the first side and a plurality of openings disposed through the second concave portion.

The grinding assembly also includes a disc component configured to be received by the lip portion. Moreover, the grinding assembly also includes a first magnetic component receivable by the second side of the first component and a second magnetic component receivable by the first side of the chamber component. The first magnetic component maintains a magnetic connection with the second magnetic component to affix the first component to the chamber component.

In an illustrative embodiment, each of the first set of protrusions of the first component and the second set of protrusions of the chamber component comprise concentrically arranged hexagonal teeth. The concentrically arranged hexagonal teeth of the first set of protrusions and the concentrically arranged hexagonal teeth of the second set of protrusions are mirrored to form opposing parallel tapered faces. Each face of the parallel tapered faces is at a distance from each other to promote grinding of the substance. Each tooth of the concentrically arranged hexagonal teeth of the first set of protrusions and the second set of protrusions comprises a quantity of hexagonal prismatic segments. The hexagonal prismatic segments are stacked from a larger base to a smaller head to form a stepped hexagonal cone. In examples, the stepped hexagonal cone comprises serrated edges.

Moreover, during use of the grinding assembly, the concave portion of the chamber component receives the ground substance. User rotation of the first component moves the concentrically arranged hexagonal teeth of the first set of protrusions such that the concentrically arranged hexagonal teeth of the first set of protrusions engage the concentrically arranged hexagonal teeth of the second set of protrusions in a motion to form cutting faces against one another to grind the substance. The motion comprises a rotational pulling motion. Further, the concentrically arranged hexagonal teeth of the first set of protrusions are counter-rotated relative to the concentrically arranged hexagonal teeth of the second set of protrusions. In preferred examples, as a result of this action and based on the configuration of the concentrically arranged hexagonal teeth, the herb is ground into a much thicker consistency that resembles a hand-broken consistency. The ground substance falls through the plurality of openings of the chamber component into the second component for storage. As such, the concentrically arranged hexagonal teeth, their placement, and the enlarged holes (e.g., the plurality of openings of the chamber component) make this invention unique.

BRIEF DESCRIPTION OF THE DRAWINGS

FIG. 8A depicts a side view of a bottom component having a portion B of a grinding assembly or apparatus, according to at least some embodiments disclosed herein.

FIG. 9 depicts a perspective view of a ring component of a grinding assembly or apparatus, according to at least some embodiments disclosed herein.

FIG. 15 depicts a side view of a chamber component of a grinding assembly or apparatus, according to at least some embodiments disclosed herein.

DESCRIPTION OF THE PREFERRED EMBODIMENTS

Figure 1:
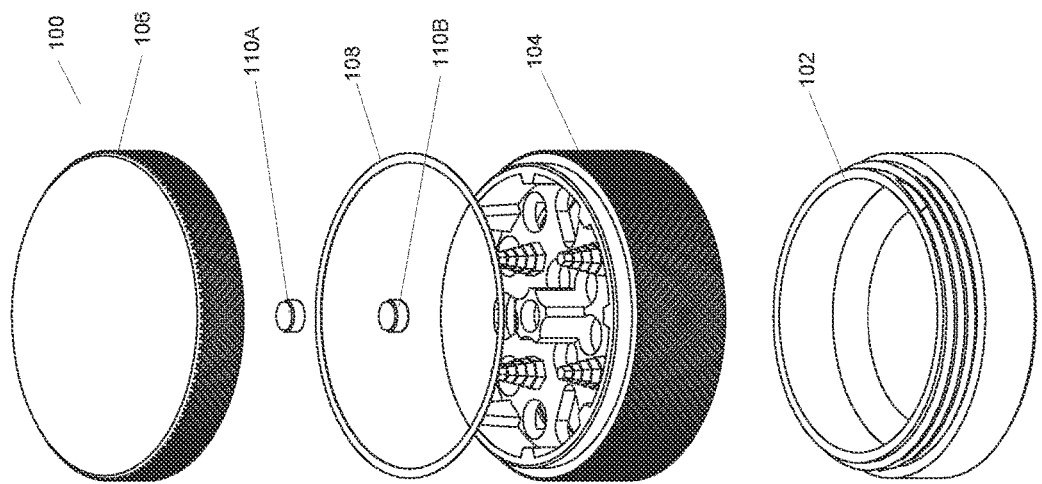
FIG. 1 depicts an exploded view of a grinding assembly or apparatus, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
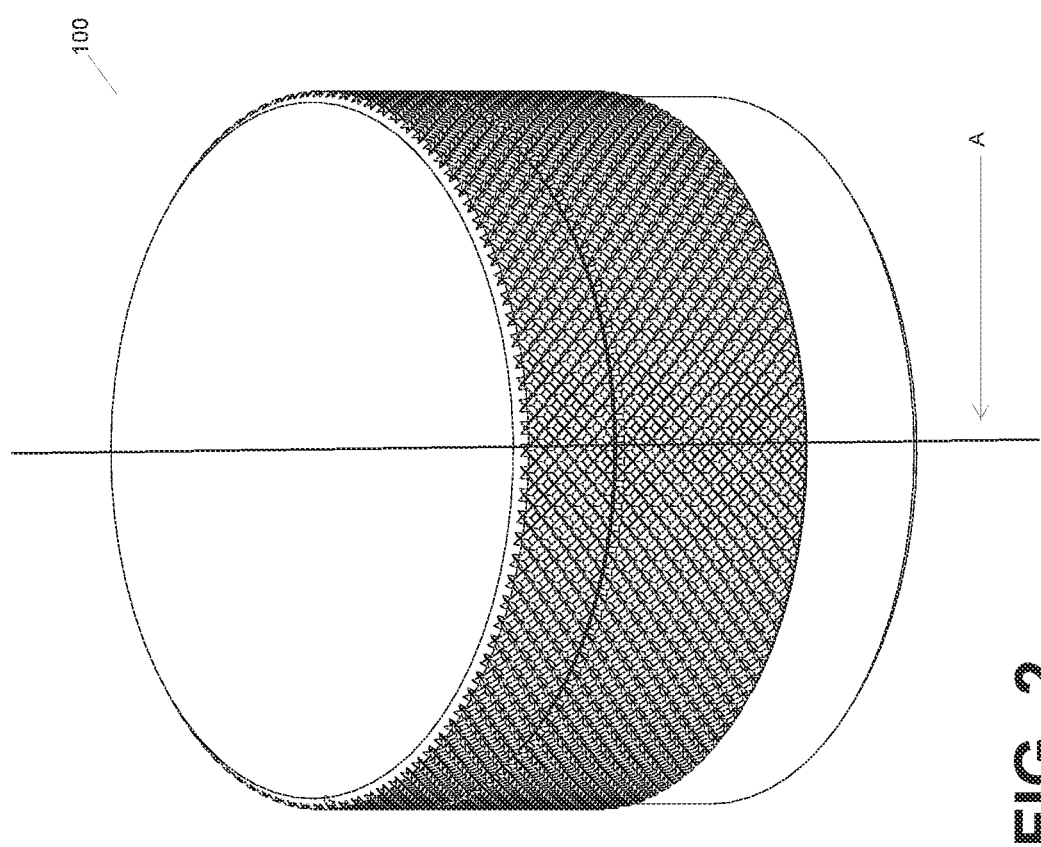
FIG. 2 depicts a side view of a grinding assembly or apparatus, according to at least some embodiments disclosed herein.

An embodiment of the present invention describes and depicts a grinding assembly 100 (or a grinding apparatus 100) for grinding a substance in at least FIG. 1 and FIG. 2. The substance may be a partially dried substance or a dried substance. In examples, the ground substance is tobacco, an herb, or *cannabis*. In preferred examples, the herb grinding assembly 100 is configured to grind the herb into a much thicker consistency that resembles a hand-broken consistency, which differs from the consistency formed from traditional systems. However, it should be appreciated that the ground substance may be another substance not explicitly listed herein. Moreover, in some implementations, the ground substance may be handled and smoked in a pipe. In other embodiments, the ground substance may be used in a handmade cigarette. As shown in FIG. 1, the grinding assembly 100 includes numerous components, such as:

a first component 106, a second component 102, a chamber component 104, a disc component 108, a first magnetic component 110A and a second magnetic component 110B. Further, as shown in FIG. 2, when assembled, the grinding assembly 100 is cylindrical in shape and is symmetrical about an A axis. However, it should be appreciated that the shape of the grinding assembly 100 is described for illustrative purposes only and other shapes are contemplated. Each component of the grinding assembly 100 will be discussed in turn herein.

Figure 3:
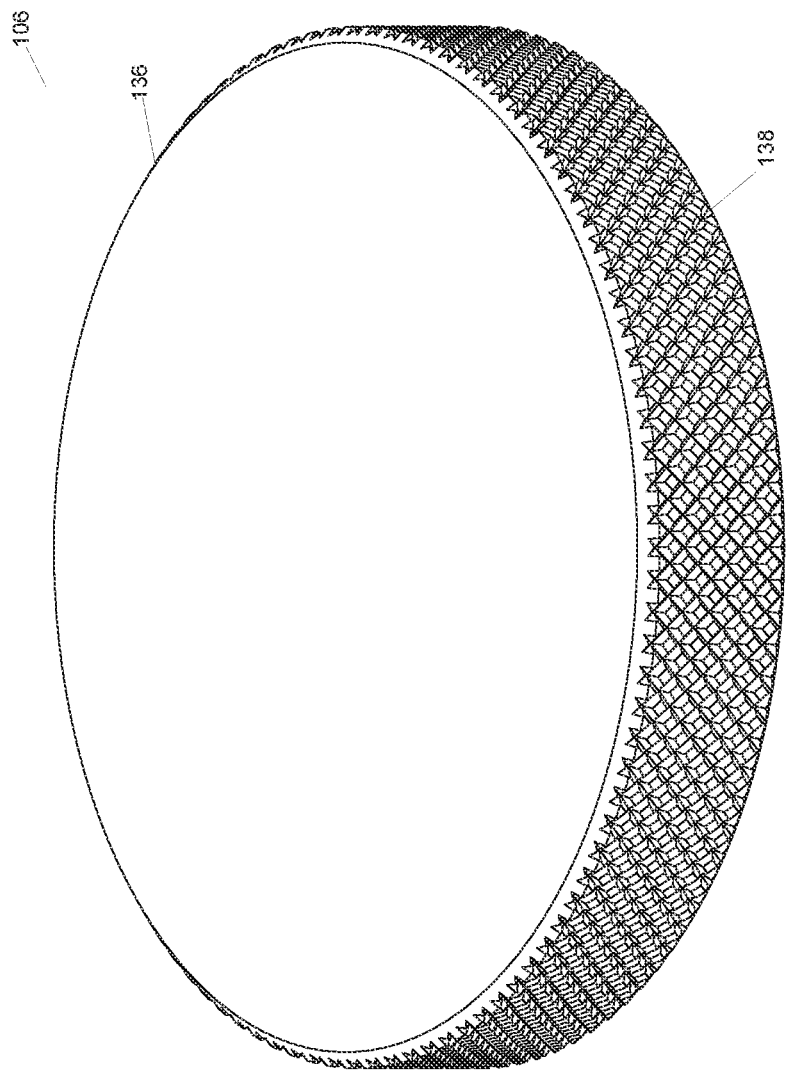
FIG. 3 depicts a perspective view of a top component of a grinding assembly or apparatus, according to at least some embodiments disclosed herein.
Figure 4:
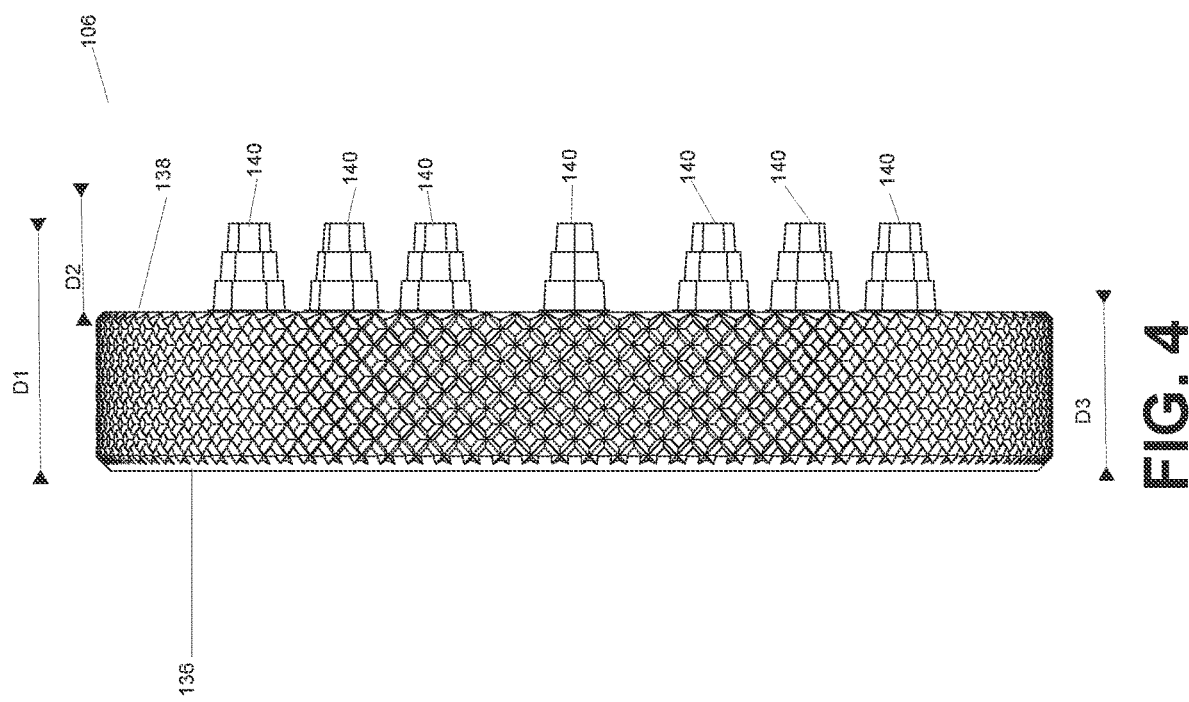
FIG. 4 depicts a side view of a top component of a grinding assembly or apparatus, according to at least some embodiments disclosed herein.
Figure 5:
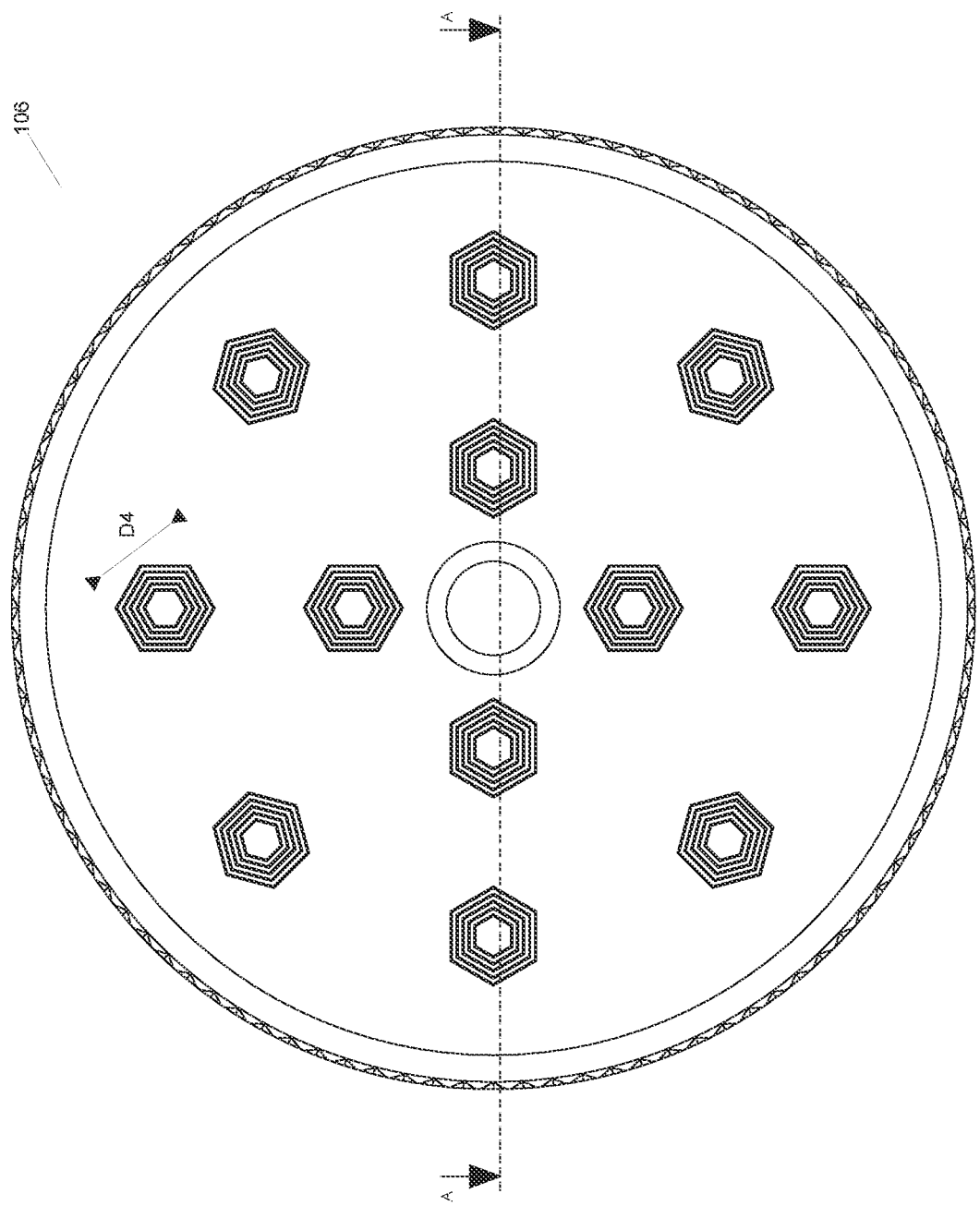
FIG. 5 depicts a bottom view of a top component of a grinding assembly or apparatus, according to at least some embodiments disclosed herein.
Figure 6:
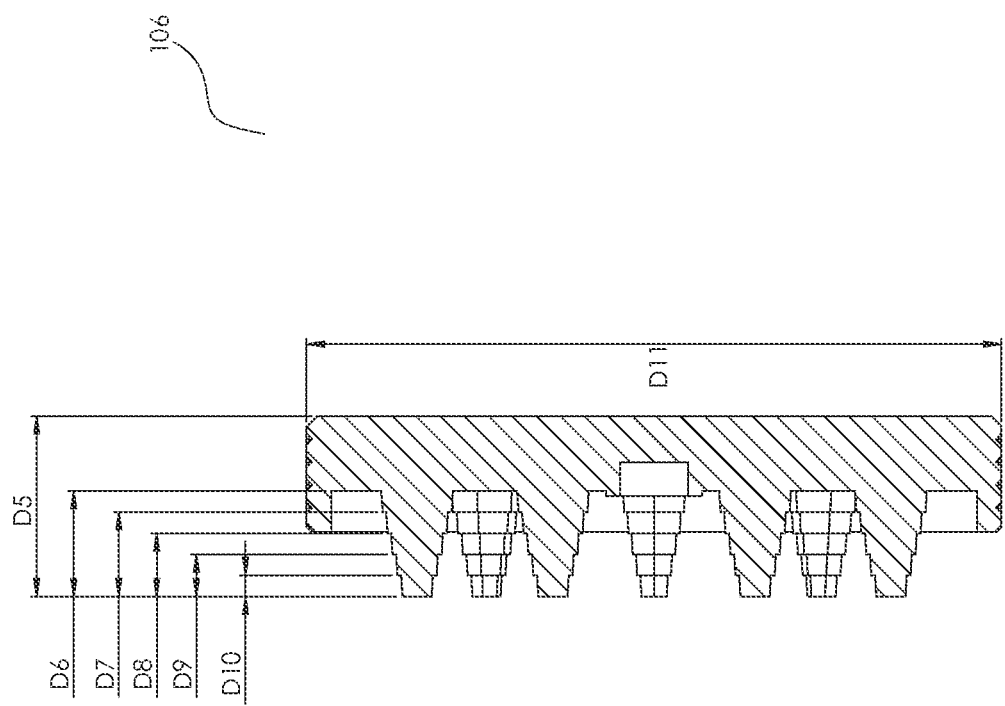
FIG. 6 depicts a front view of a top component of a grinding assembly or apparatus, according to at least some embodiments disclosed herein.

The first component 106 (or a top component) of the grinding assembly 100 is shown in FIG. 3, FIG. 4, FIG. 5, and FIG. 6. As shown in FIG. 3, the first component 106 of the grinding assembly 100 has a first side 136 disposed opposite a second side 138. A wall is located around a periphery of and extends away from the second side 138 of the first component 106 of the grinding assembly 100. As shown in FIG. 4, the first component 106 of the grinding assembly 100 also includes a first set of protrusions 140 extending away from the second side 138. It should be appreciated that in some examples, the first set of protrusions 140 are symmetrical about an A-axis, as shown in FIG. 5. Moreover, though a particular quantity of protrusions of the first set of protrusions 140 are depicted, it should be appreciated that any quantity of protrusions may be used herein.

Furthermore, various ranges of dimensions ("D") of the first component 106 are depicted in Table 1 below. However, it should be appreciated that these dimensions are provided for illustrative purposes only and other dimensions are contemplated herein.

TABLE 1

Dimensions of the First Component of the Grinding Assembly

| Dimension | Range (mm) |
|---|---|
| D1 | 11-22 |
| D2 | 1-11 |
| D3 | 5-15 |
| D4 | 1-10 |
| D5 | 11-22 |
| D6 | 5-15 |
| D7 | 5-15 |
| D8 | 5-15 |

TABLE 1-continued

Dimensions of the First Component of the Grinding Assembly

| Dimension | Range (mm) |
|---|---|
| D9 | 1-10 |
| D10 | 0.1-5 |
| D11 | 55-75 |

Figure 7:
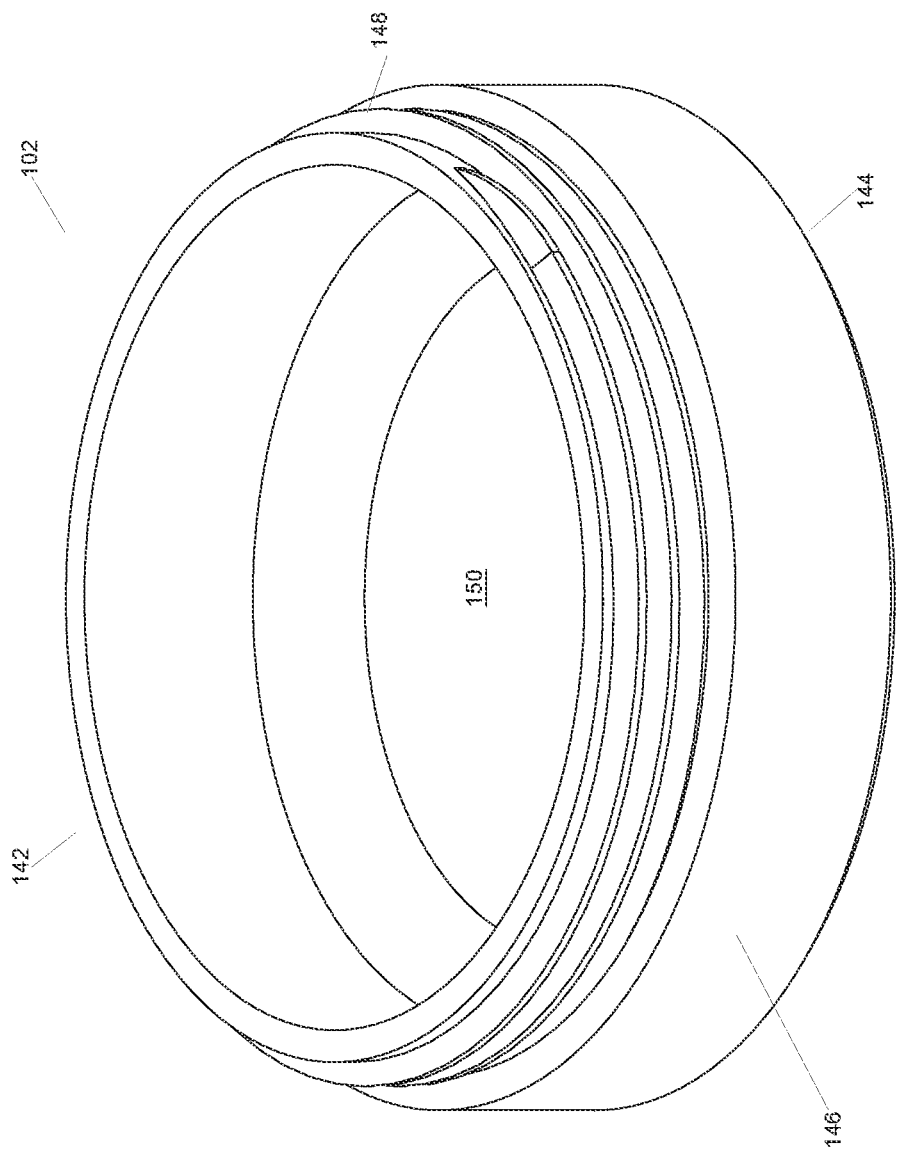
FIG. 7 depicts a perspective view of a bottom component of a grinding assembly or apparatus, according to at least some embodiments disclosed herein.
Figure 8B:
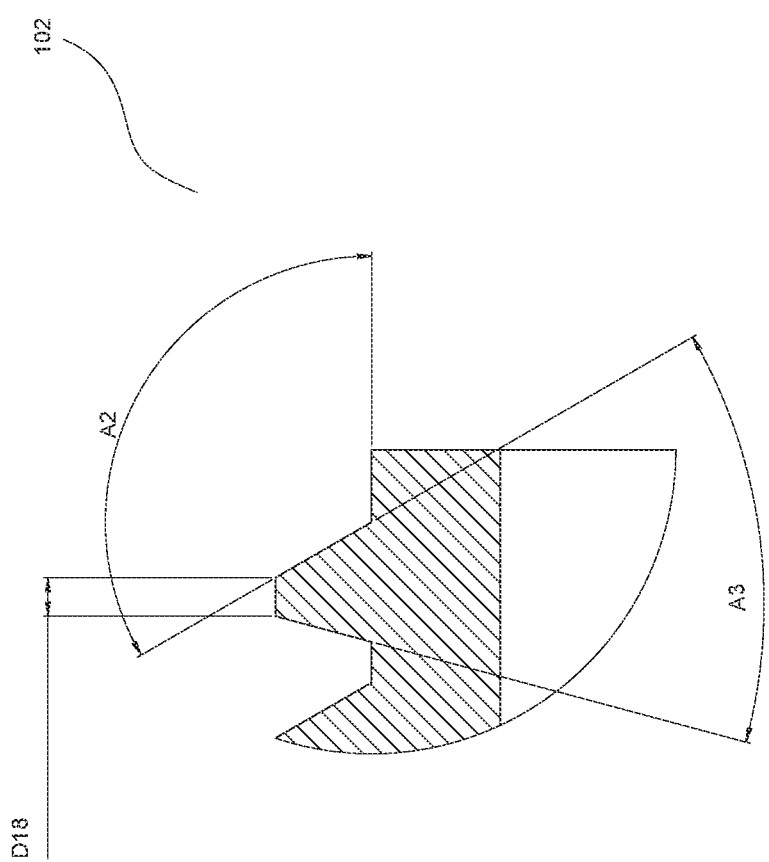
FIG. 8B depicts a perspective view of the portion B of the bottom component of FIG. 8A, according to at least some embodiments disclosed herein.

The second component 102 of the grinding assembly 100 is shown in at least FIG. 7, FIG. 8A, and FIG. 8B herein. As shown in FIG. 7, the second component 102 of the grinding assembly 100 includes a first side 142 disposed opposite a second side 144, a wall 146 located around a periphery of and extending away from the second side 144 to create a concave portion 150, and a threaded portion 148 disposed on a periphery of the wall 146.

FIG. 8A also depicts a portion B that is expanded in FIG. 8B. Furthermore, various angles ("A") and dimensions ("D") of the second component 102 are depicted in Table 2 below. However, it should be appreciated that these dimensions are provided for illustrative purposes only and other dimensions are contemplated herein.

TABLE 2

Dimensions and Angles of the Second Component of the Grinding Assembly

| Dimension/Angle | Range (mm) |
|---|---|
| D12 | 15-25 |
| D13 | 10-20 |
| D14 | 5-15 |
| D15 | 5-15 |
| D16 | 1-10 |
| D17 | 55-75 |
| D18 | 0.1-5 |
| A1 | 35-55° |
| A2 | 110-130° |
| A3 | 35-55° |

Figure 10:
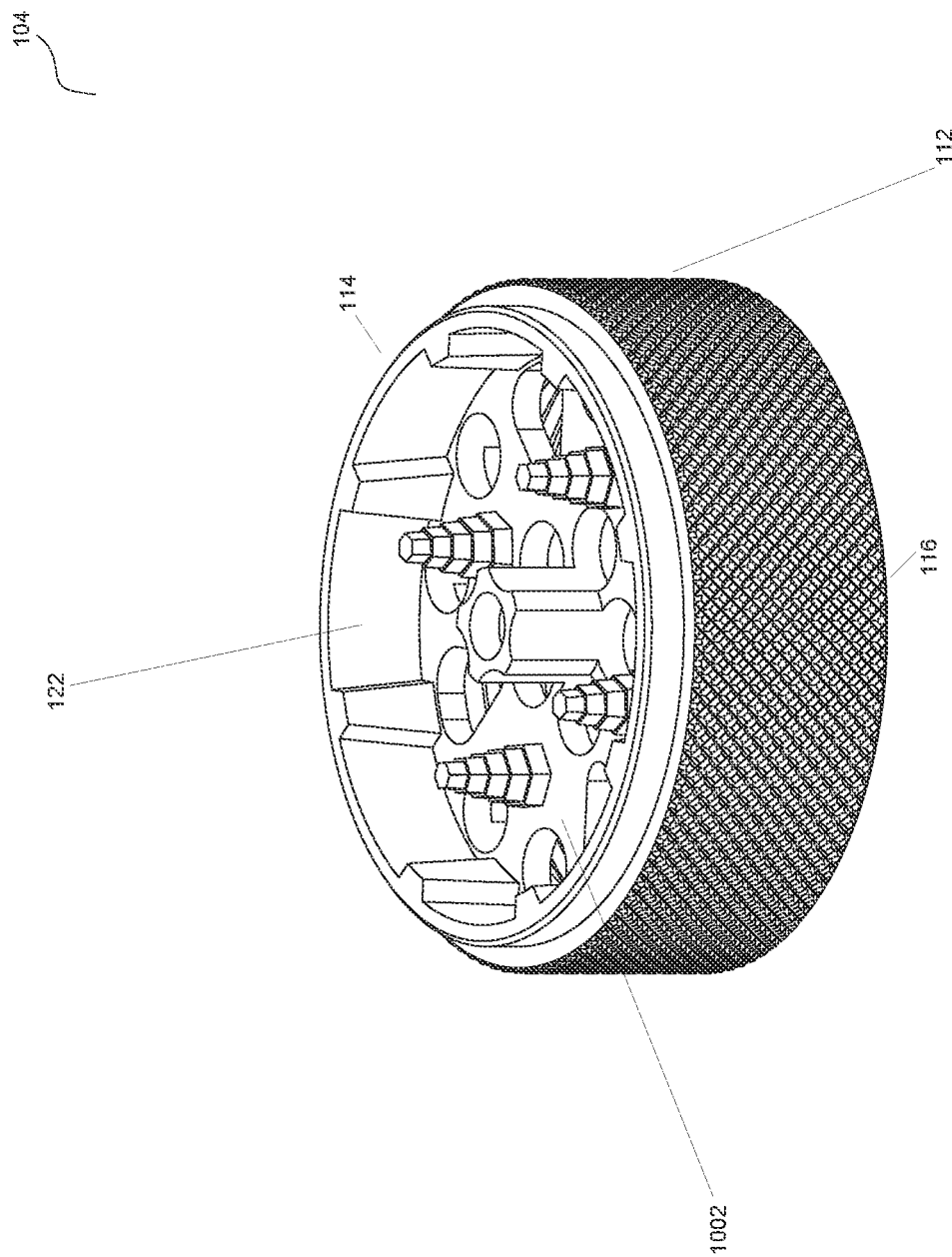
FIG. 10-FIG. 12 depict perspective views of a chamber component of a grinding assembly or apparatus, according to at least some embodiments disclosed herein.

The grinding assembly 100 also includes a disc component 108 (as shown in FIG. 9). Further, the chamber component 104 of the grinding assembly 100 is shown in at least FIG. 10, FIG. 11, FIG. 12, FIG. 13, FIG. 14A, FIG. 14B, and FIG. 15. As shown in FIG. 10, the chamber component 104 of the grinding assembly 100 includes a body portion 112 comprising a first side 114 disposed opposite a second side 116.

Figure 14A:
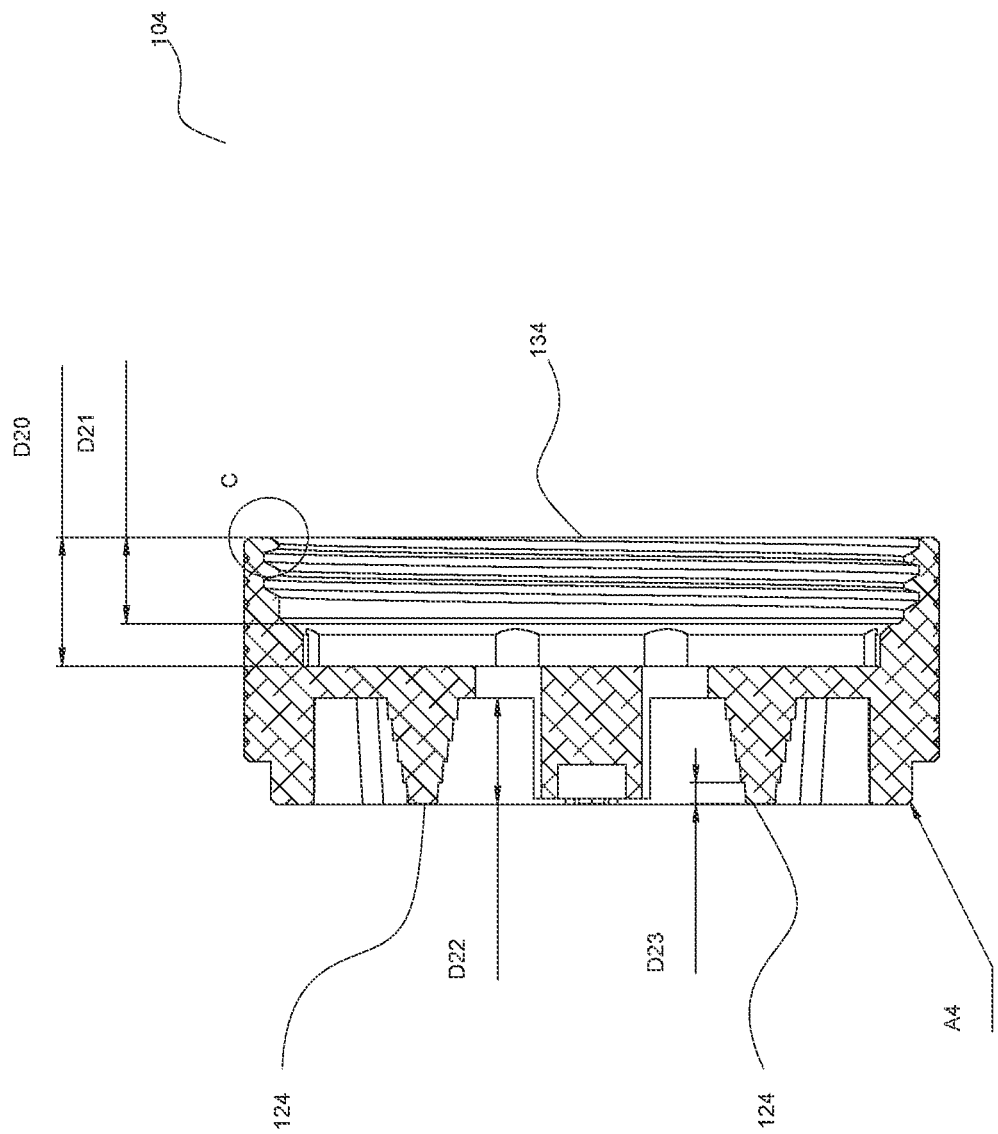
FIG. 14A depicts a cut away view of a chamber component having a portion C of a grinding assembly or apparatus, according to at least some embodiments disclosed herein.

As shown in FIG. 14A, the second side 116 of the chamber component 104 of the grinding assembly 100 includes a threaded portion 134. The threaded portion 134 of the second side 116 of the chamber component 104 is configured to interact with the threaded portion 148 (of FIG. 7) of the second component 102 to affix the second component 102 to the chamber component 104.

The chamber component 104 also includes a wall 118 located around a periphery and extending away from the first side 114 to create a concave portion 122 of FIG. 10. The wall 118 of the chamber component 104 comprises a first circumference and second component 102 comprises a second circumference. The first circumference is less than the second circumference such that a lip portion 120 (of FIG. 11) is created between an exterior of the wall 118 and an exterior of the chamber component 104. The disc component 108 (as shown in FIG. 9) is configured to be received by the lip portion 120 of the chamber component 104 during assembly of the grinding assembly 100.

Figure 11:
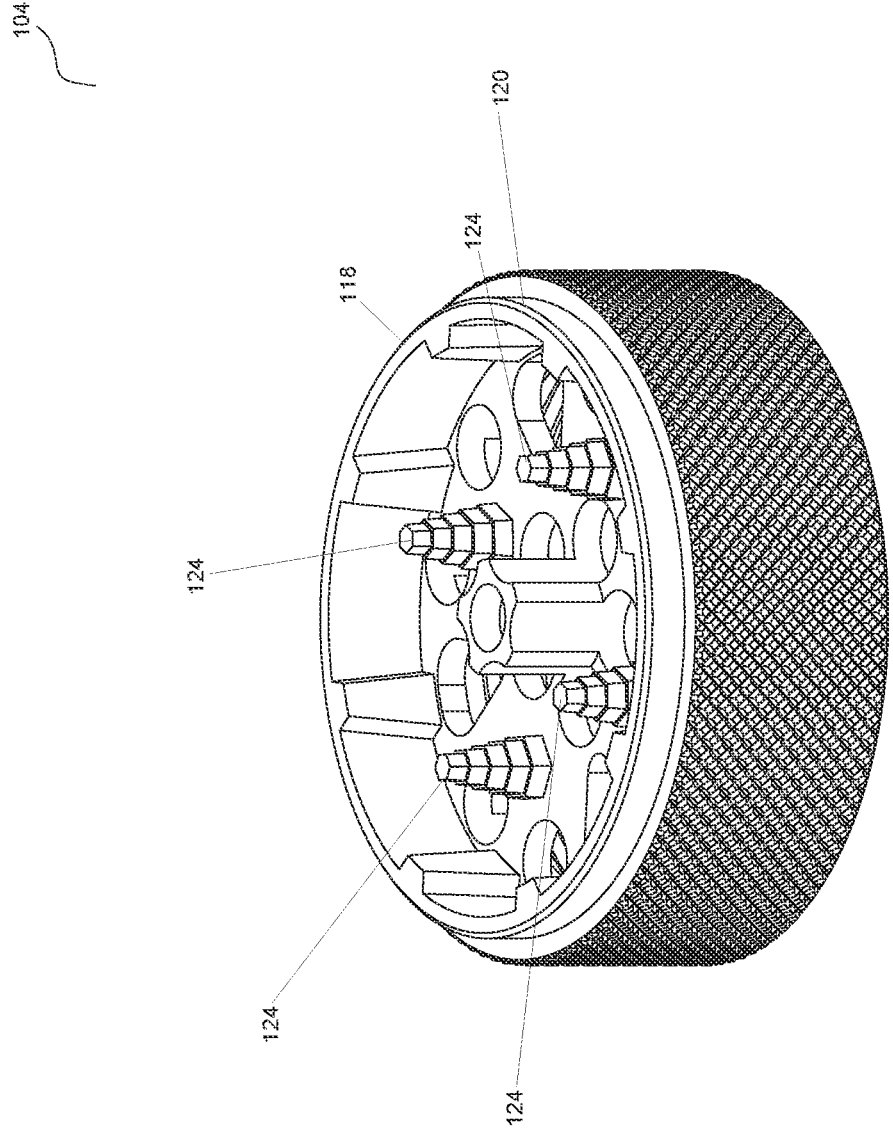

In some examples, and as shown in FIG. 11, protrusions 128 are located on an interior of the wall 118 and extend way from the interior of the wall 118 towards a center of the concave portion 122. The protrusions 128 depicted in FIG. 11 are rectangular in shape. However, other shapes are contemplated by Applicant. Moreover, any quantity of the protrusions 128 may be used herein.

Figure 12:
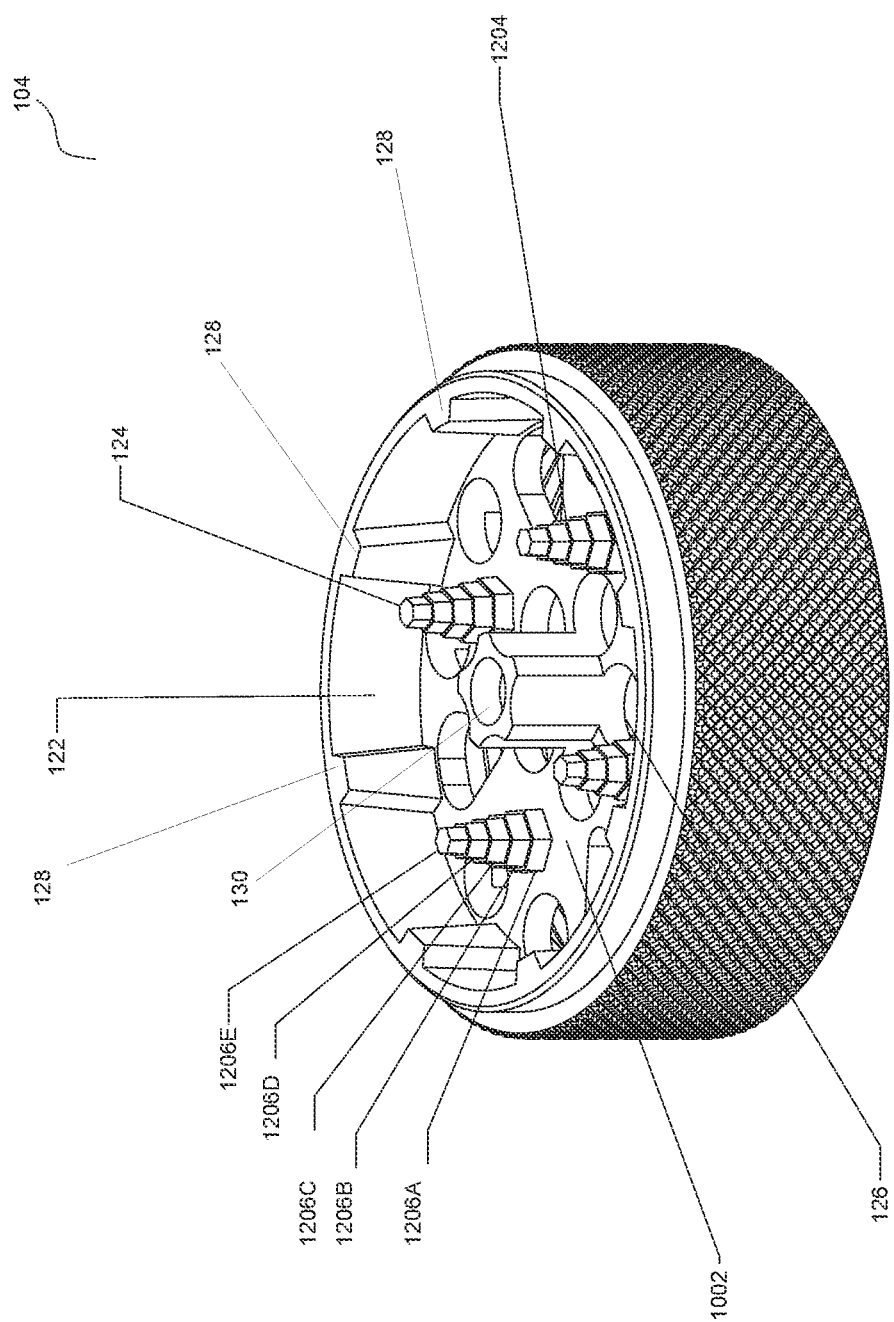
Figure 13:
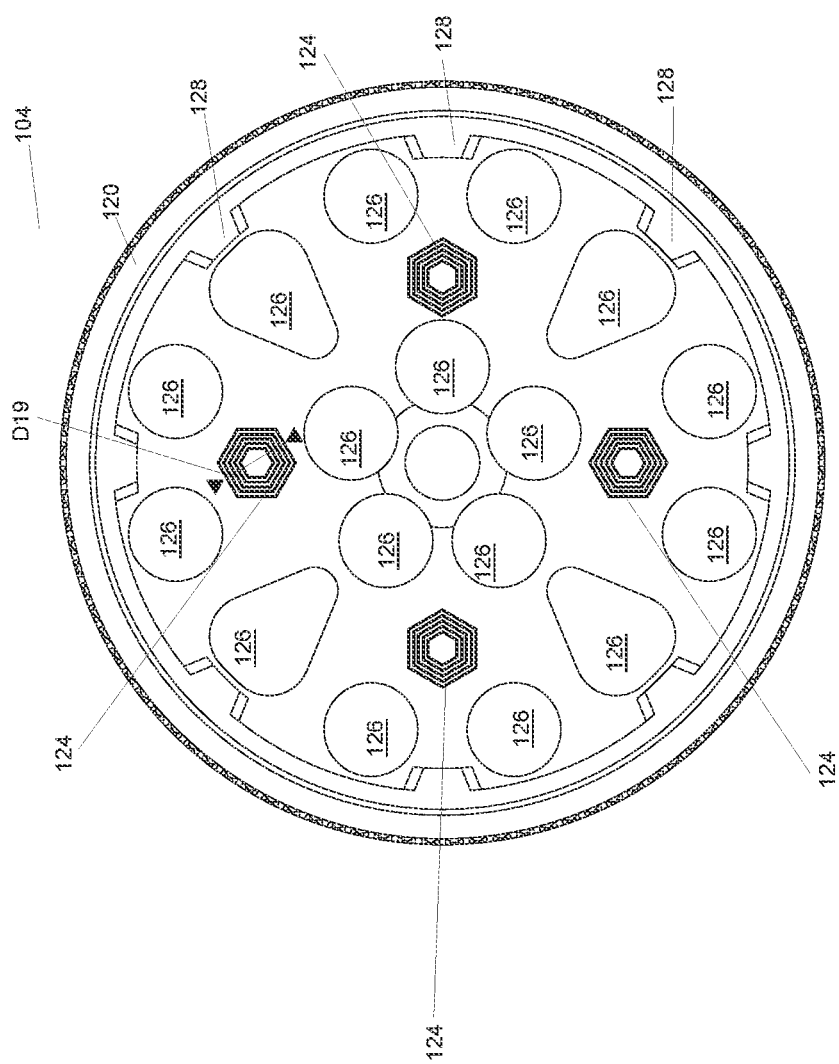
FIG. 13 depicts a top view of a chamber component of a grinding assembly or apparatus, according to at least some embodiments disclosed herein.

Additionally, the chamber component 104 also includes a second set of protrusions 124 located on the first side 114 of the concave portion 122 and extending away from the first side 114. The second set of protrusions 124 are depicted, at least, in FIG. 10, FIG. 11, FIG. 12, and FIG. 14A. As shown in FIG. 12 and FIG. 13, the chamber component 104 also includes a plurality of openings 126 disposed through the concave portion 122. The plurality of openings 126 may be arranged symmetrically about an A-axis, as shown in FIG. 13.

Figure 14B:
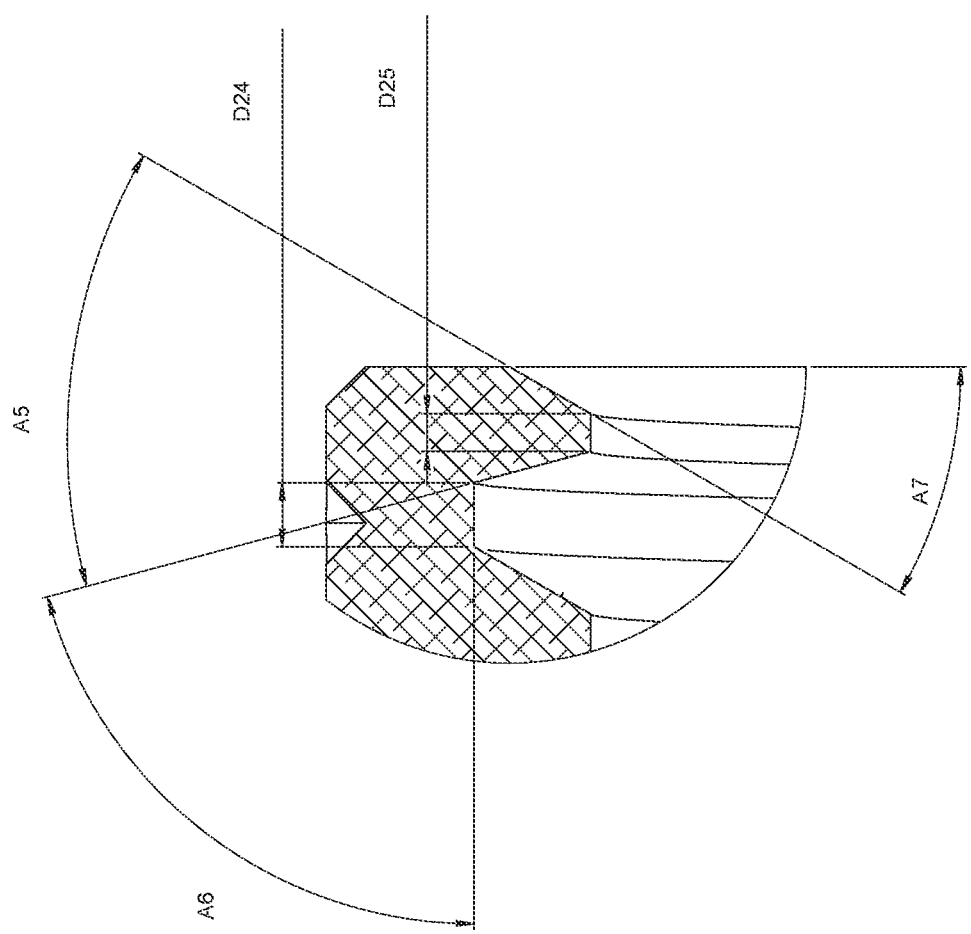
FIG. 14B depicts a perspective view of the portion C of the chamber component of FIG. 14A, according to at least some embodiments disclosed herein.

FIG. 14A also depicts a portion C that is expanded in FIG. 14B. Various angles ("A") and dimensions ("D") of the chamber component 104 are described in Table 3 below. However, it should be appreciated that these dimensions are provided for illustrative purposes only and other dimensions are contemplated herein.

TABLE 3

Dimensions and Angles of the Chamber Component of the Grinding Assembly

| Dimensions/Angles | Range (mm) |
| --- | --- |
| D19 | 1-10 |
| D20 | 5-20 |
| D21 | 1-15 |
| D22 | 1-15 |
| D23 | 0.1-5 |
| D24 | 0.1-2 |
| D25 | 0.1-5 |
| D26 | 0.1-5 |
| D27 | 15-35 |
| A4 | 35-55° |
| A5 | 35-55° |
| A6 | 65-85° |
| A7 | 20-40° |

Moreover, the chamber component 104 also includes a receiving portion 130 (of FIG. 12) extending away from the planar surface 1002 of chamber 122. The receiving portion 130 receives the second magnetic component 110B therein. The first magnetic component 110A is receivable by the second side 138 of the first component 106 such that the first magnetic component 110A maintains a magnetic connection with the second magnetic component 110B to affix the first component 106 to the chamber component 104.

In an implementation, the first set of protrusions 140 of the first component 106 and the second set of protrusions 124 of the chamber component 104 comprise concentrically arranged hexagonal teeth. The concentrically arranged hexagonal teeth of the first set of protrusions 140 and the concentrically arranged hexagonal teeth of the second set of protrusions 124 are mirrored to form opposing parallel tapered faces. Each face of the parallel tapered faces is at a distance from each other to promote grinding of the substance. Each tooth of the concentrically arranged hexagonal teeth of the first set of protrusions 140 and the second set of protrusions 124 comprises a quantity of hexagonal prismatic segments. The hexagonal prismatic segments are stacked from a larger base to a smaller head to form a stepped hexagonal cone. The stepped hexagonal cone comprises serrated edges.

It should be appreciated that the description provided herein for the first set of protrusions 140 of the first component 106 and the second set of protrusions 124 of the chamber component 104 is for illustrative purposes only and other shapes, quantities, and dimensions are contemplated herein. For example, in other implementations, the first set of protrusions 140 of the first component 106 and the second set of protrusions 124 of the chamber component 104 may comprise teeth having one or more of the following shapes: a circular shape, an oval shape, a rectangular shape, a square shape, a triangular shape, a quadrilateral shape, a pentagonal shape, a hexagonal shape, a heptagonal shape, an octagonal shape, a nonagonal shape, or a decagonal shape.

Moreover, during use, the concave portion 122 of the chamber component 104 receives the ground substance. User rotation of the first component 106 moves the concentrically arranged hexagonal teeth of the first set of protrusions 140 such that the concentrically arranged hexagonal teeth of the first set of protrusions 140 engage the concentrically arranged hexagonal teeth of the second set of protrusions 124 in a motion to form cutting faces against one another to grind the substance. The motion comprises a rotational pulling motion. Further, the concentrically arranged hexagonal teeth of the first set of protrusions 140 are counter-rotated relative to the concentrically arranged hexagonal teeth of the second set of protrusions 124. As a result of these actions/motions and based on the configuration of the concentrically arranged hexagonal teeth, the herb is ground into a much thicker consistency that resembles a hand-broken consistency, which differs from the consistency formed from traditional systems. The ground substance falls through the plurality of openings 126 of the chamber component 104 into the second component 102 for storage.

It should be appreciated that the grinding assembly 100 described herein accentuates the consistency of the ground substance. In some examples, the herb grinding assembly 100 grinds the herb into a consistency resembling a hand-broken consistency. As such, the grinding assembly 100 is used to mimic a more natural hand-broken end product.

Furthermore, as shown in at least FIG. 2, FIG. 3, FIG. 4, FIG. 10, FIG. 11, FIG. 12, and FIG. 15, the body portion 112 of the chamber component 104 and the first component 106 may comprise a texturized grip. In examples, the texturized grip may comprise a knurl or a modified knurl. In specific examples, the texturized grip may comprise a knurl at a 1.5 mm pitch and at 0.5 mm deep. It should be appreciated that, as described herein, knurling is a manufacturing process, typically conducted on a lathe, whereby a pattern of straight, angled or crossed lines is rolled into the material. As explained, the concentrically arranged hexagonal teeth of the second set of protrusions 124, their placement, and the plurality of openings 126 of the chamber component 104 make this invention unique.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the"

are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A grinding assembly configured for grinding a substance, the grinding assembly comprising:
   a first component comprising:
      a first side disposed opposite a second side; and
      a wall located around a periphery of and extending away from the second side; and
      a first set of protrusions extending away from the second side;
   a second component comprising:
      a first side disposed opposite a second side;
      a wall located around a periphery of and extending away from the second side to create a concave portion; and
      a first threaded portion disposed on a periphery of the wall;
   a chamber component comprising:
      a body portion comprising a first side disposed opposite a second side, the second side comprising a second threaded portion configured to interact with the first threaded portion of the second component to affix the second component to the chamber component;
      a wall located around a periphery of a planar surface and extending away from the first side to create a chamber, wherein the chamber of the chamber component having a receiving portion, the receiving portion having an end connected to a substantially central portion of the planar surface located opposite another end configured to be connected to a magnet, the receiving portion has a radiused guide wall comprising at least one curved surface traversing a length of the receiving portion;
      a second set of protrusions located on the first side of the concave portion and extending away from the first side, wherein a protrusion of the second set of protrusions having a plurality of prismatic segments, the plurality of prismatic segments are stacked from a larger base to a smaller head to form a stepped cone, wherein the protrusion having at least one stepped portion; and
      a plurality of openings disposed through the planar surface of the chamber, wherein at least one curved surface of the radiused guide wall of the receiving portion abuts an outer perimeter edge of at least one opening of the plurality of openings of the planar surface of the chamber.

2. The grinding assembly of claim 1, wherein the grinding assembly is cylindrical in shape.

3. The grinding assembly of claim 1, wherein each of the first set of protrusions of the first component and the second set of protrusions of the chamber component comprise concentrically arranged teeth.

4. The grinding assembly of claim 3, wherein the concentrically arranged hexagonal teeth of the first set of protrusions and the concentrically arranged hexagonal teeth of the second set of protrusions are mirrored to form opposing parallel tapered faces.

5. The grinding assembly of claim 4, wherein each face of the parallel tapered faces is at a distance from each other to promote grinding of the substance.

6. The grinding assembly of claim 3, wherein the chamber of the chamber component receives a ground substance.

7. The grinding assembly of claim 6, wherein user rotation of the first component moves the concentrically arranged hexagonal teeth of the first set of protrusions such that the concentrically arranged hexagonal teeth of the first set of protrusions engage the concentrically arranged hexagonal teeth of the second set of protrusions in a motion to form cutting faces against one another to grind a substance.

8. The grinding assembly of claim 7, wherein the motion comprises a rotational pulling motion.

9. The grinding assembly of claim 7, wherein the concentrically arranged teeth of the first set of protrusions are counter-rotated relative to the concentrically arranged teeth of the second set of protrusions.

10. The grinding assembly of claim 7, wherein the ground substance falls through the plurality of openings of the chamber component into the second component for storage.

11. The grinding assembly of claim 1, wherein the at least one stepped portion comprises serrated edges.

12. The grinding assembly of claim 1, further comprising:
    a first magnetic component receivable by the second side of the first component; and
    a second magnetic component receivable by the receiving portion of the chamber component.

13. The grinding assembly of claim 12, wherein the first magnetic component maintains a magnetic connection with the second magnetic component to affix the first component to the chamber component.

14. A grinding assembly configured for grinding a substance, the grinding assembly comprising:
    a first component comprising:
       a first side disposed opposite a second side; and
       a wall located around a periphery of and extending away from the second side; and
       a first set of protrusions extending away from the second side;
    a second component comprising:
       a first side disposed opposite a second side;
       a wall located around a periphery of and extending away from the second side to create a concave portion; and
       a first threaded portion disposed on a periphery of the wall;
    a chamber component comprising:
       a body portion comprising a first side disposed opposite a second side, the second side comprising a second threaded portion configured to interact with the first threaded portion of the second component to affix the second component to the chamber component;
       a wall located around a periphery of a planar surface and extending away from the first side to create a chamber;
       wherein, the chamber component having a second set of protrusions, wherein a protrusion of the second set of protrusions having a plurality of prismatic segments, the plurality of prismatic segments are stacked from a larger base to a smaller head to form a stepped cone, wherein the protrusion having at least one stepped portion; and a plurality of openings disposed through the planar surface of the chamber.

\* \* \* \* \*